United States Patent [19]

Irwin

[11] Patent Number: 5,052,739

[45] Date of Patent: Oct. 1, 1991

[54] DEVICE FOR ATTACHMENT OF MULTIPLE APPLIANCES TO A VEHICLE CARGO BED

[76] Inventor: Gary B. Irwin, P.O. Box 132, Free Port, Me. 04032

[21] Appl. No.: 496,803

[22] Filed: Mar. 21, 1990

[51] Int. Cl.[5] ............................................. B60R 9/06
[52] U.S. Cl. .................. 296/37.6; 296/100; 296/164; 297/232
[58] Field of Search ............... 296/37.6, 63, 64, 65.1, 296/156, 163, 164, 165, 100, 69; 224/310; 297/232, 450

[56] References Cited

U.S. PATENT DOCUMENTS

| | | | |
|---|---|---|---|
| 1,005,080 | 10/1911 | Storm | 296/63 |
| 3,471,045 | 10/1969 | Panciocco | 296/37.6 X |
| 3,773,380 | 11/1973 | Stockdill | 296/100 |
| 4,522,326 | 6/1985 | Tuohy | 296/37.6 X |
| 4,635,992 | 1/1987 | Hamilton et al. | 296/37.6 |
| 4,648,649 | 3/1987 | Beal | 296/156 |

FOREIGN PATENT DOCUMENTS

| | | | |
|---|---|---|---|
| 1172289 | 8/1984 | Canada | 296/156 |
| 2835792 | 3/1979 | Fed. Rep. of Germany | 296/69 |

*Primary Examiner*—Margaret A. Focarino
*Assistant Examiner*—Gary C. Hoge
*Attorney, Agent, or Firm*—Charles J. Herron

[57] ABSTRACT

A device for attachment of appliances to a vehicle cargo bed. The device has a main body that is attached to the cargo bed side walls and has an elongated portion on the top and side of the side walls, respectively. Each portion has an element that engages with an appliance having a complementary configuration and an element for stationary attachment of the appliance.

16 Claims, 3 Drawing Sheets

DEVICE FOR ATTACHMENT OF MULTIPLE APPLIANCES TO A VEHICLE CARGO BED

BACKGROUND OF THE INVENTION

1. Field Of The Invention

The present invention relates to the field of apparatus for attaching appliances to cargo beds of vehicles, such as pick-up trucks, particularly for attaching multiple, removable appliances.

2. Brief Description Of The Prior Art

Pick-up truck cargo beds have been provided with tool boxes and other devices and assemblies and numerous patents have been granted in this field. See, generally, Whatley, U.S. Pat. No. 4,531,774 and Waters, U.S. Pat. No. 4,488,669. Of additional interest are the following patents.

Tuohy, U.S. Pat. No. 4,522,326 discloses a single rolling tool box for a pick-up truck cargo bed. The tool box consists of a frame having rollers which are received in a pair of channels fastened to the inside of the cargo bed. It also includes a pole with a hook for pulling or pushing the box and to render it stationary when the truck is in motion. Its stated purpose is to roll the tool box rearward for access, the user thereby avoiding the need to climb into the cargo bed. Thus, this apparatus impinges on the utility of the cargo bed by limiting the cubic feet of space available. Also, the design creates a potential for significant problems with rusting of parts.

Boyd, U.S. Pat. No. 4,507,033 also discloses apparatus for a pick-up truck cargo bed. The apparatus has side rails attached to the cargo bed side walls and connectors associated with each side rail for movement therealong. Retainers are coupled to the connectors and are attached to a divider extending between the side walls which can be secured at various positions along the side rails. Thus, the weight carrying capacity and load bearing characteristics are limited by the number and positioning of the cargo bed stanchions.

Hamilton, et al, U.S. Pat. No. 4,635,992 discloses a storage box suspended on side rails of a pick-up truck cargo bed which is enclosed by a camper shell fixed in place on top of the cargo bed side walls. The storage box can be slid along the side rails and opened from the front or rear of the cargo compartment. The main feature is that the top panel of the box can be removed while the box is in this confined space of limited headroom. Thus, the weight carrying capacity and load bearing characteristics are limited by the number and positioning of the cargo bed stanchions.

Panciocco, U.S. Pat. No. 3,471,045 discloses auxiliary equipment for pick up trucks for storing tools and the like and for dumping materials. Channels are secured to the stanchions on the inner surface of the cargo bed side walls. Rollers located on a tool box and on a carriage hinged to a dump bed move within the channels.

Temp, U.S. Pat. No. 2,784,027 discloses a false load-carrying floor above the cargo bed of a pick-up truck and a large drawer fitting between the bed and false floor. This apparatus also limits the utility and available carrying capacity of the truck bed.

Peters and Parlette, U.S. Pat. No. 4,681,360 discloses a combination access box and bed liner for pick-up truck cargo beds. A pair of support members are mounted on the floor of the cargo bed and support a cargo box by rollers for front-back movement of the box. The support members and box have latches for holding the box in forward, rearward and intermediate positions. The rear end of the box is open and is closed by the cargo bed tail gate. Like the apparatus of Temp, this apparatus also limits the utility and available carrying capacity of the truck bed.

Notwithstanding these numerous efforts, none of these devices provides a unitary apparatus for the attachment of a plurality of devices that can be independently installed and removed without the need to disturb other devices that are concurrently attached to the vehicle cargo bed.

SUMMARY OF THE INVENTION

The present invention provides an apparatus for the attachment of devices to the top surface, side walls or both of a vehicle cargo bed. In contrast to the types of apparatus described above, the present invention provides an integral device that permits attachment of a plurality of appliances that can be independently installed and removed without the need to remove or otherwise disturb others of the attached appliances.

In one aspect, the apparatus comprises an integral device of first and second means for attaching a plurality of independently installable and removable appliances to the top and interior side surfaces of the side walls of a vehicle cargo bed. Each such integral device comprises a main body having substantially perpendicular first and second elongated portions; means associated with said main body for fixing the integral device to the cargo bed side wall; first and second appliance engagement means extending along the length of the first and second portions, respectively, each appliance engagement means being adapted to fit with a complementary component of an appliance so as to permit installation and removal of an appliance independent of the presence or absence of an appliance associated with the other appliance engagement means; and means associated with each of the first and second appliance engagement means for attaching the appliance in a stationary position with respect to the appliance engagement means.

The invention further provides a first complementary component associated with a first appliance and a second complementary component associated with a second appliance.

DETAILED DESCRIPTION OF PREFERRED EMBODIMENTS

Although specific terms are used in the following description for clarity, they refer only to the embodiment(s) selected for illustration, and are not a limitation of the scope of the invention.

The apparatus of the present invention is able to carry a load within the cargo bed along the side wall with attachment exclusively along the top surface of the side wall. Any appliance or device riding on either the top rail or side rail of the apparatus is supported through the vertical plane. The weight of the appliance is evenly distributed throughout the length of the cargo bed side wall. Thus, carrying capacity is not limited by the number of vertical attachment points. Rather, the carrying capacity is only limited by the load bearing capacity of the cargo bed side wall itself.

While attachment points to stanchions positioned vertically along the inner surface of the cargo bed side wall can be utilized, they are optional and are not necessary for load bearing. Attachment to such stanchions can be provided to offer additional stabilization of the load so as to prevent deflection of the track.

The invention will now be described in more detail with reference to the drawings.

Figure 1:
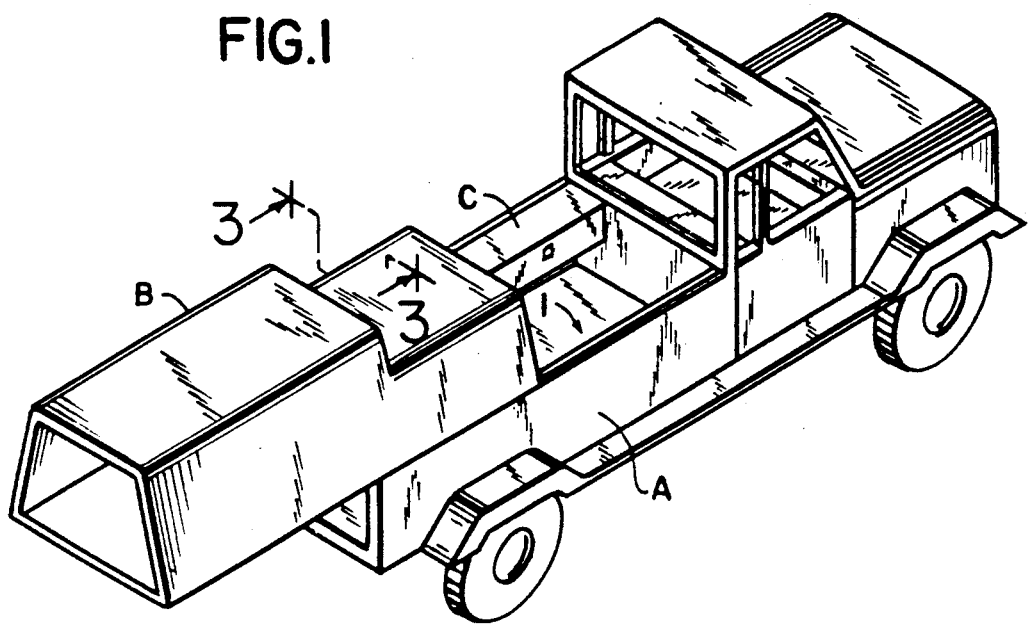
FIG. 1 is a perspective view of the invention mounted on a pickup truck cargo bed and showing an enclosure or "cap" partially mounted.

FIG. 1 shows a conventional form of pickup truck including a cargo bed having vertical side walls A on opposite sides of the cargo bed, a transverse front wall connecting the side walls at the forward end of the cargo bed and, optionally, a transverse tailgate between the rearward ends of the sidewalls. In accordance with the invention as illustrated here, integral device 1 is fixed to the top surface of each of the cargo bed side walls A and permits independent removable attachment of an appliance, such as cargo bed enclosure B and tool box C exemplified here.

Figure 2:
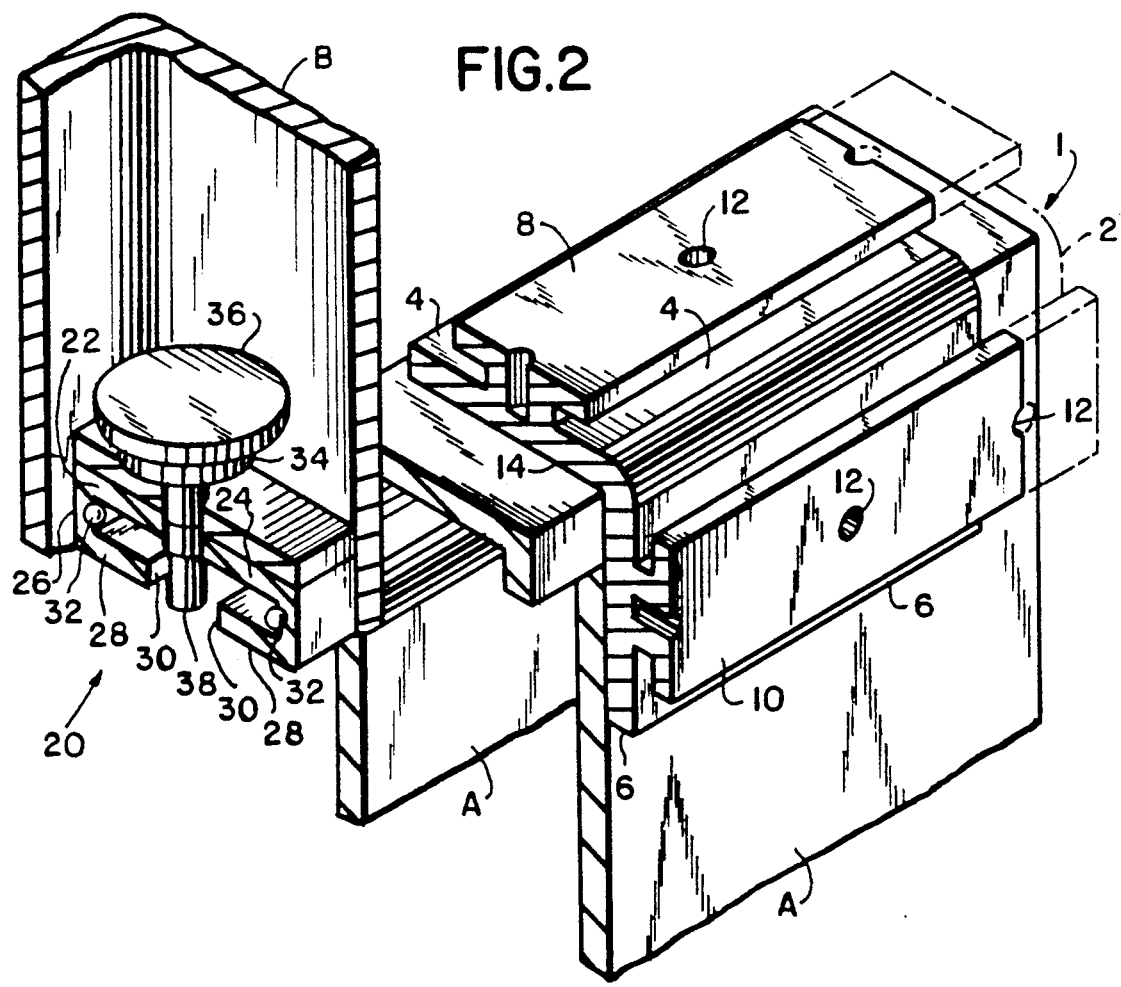
FIG. 2 is a fragmentary perspective view of on embodiment of the invention having horizontal and vertical flanged tracks and of the plunger attachment means associated with the enclosure or other appliance.

FIG. 2 shows, in detail, a portion of a male configuration embodiment of integral device 1. Integral device 1 comprises a main body 2 that is integral with a horizontal appliance engagement portion 4 and vertical appliance engagement portion 6. Appliance engagement portions 4 and 6 are provided with horizontal flanged track 8 and vertical flanged track 10, respectively. Flanged tracks 8 and 10 are provided with apparatus attachment recesses 12. Main body 2 also has a side wall contact surface 14, which is fixed to the vehicle cargo bed side wall by fasteners, welding or other conventional means of attachment (not shown). As shown in this embodiment, integral device 1 is positioned so that vertical portion 6 is adjacent to the inside surface of cargo bed side wall A, so that it can be of uniform shape regardless of the exterior contours of side wall A.

FIG. 2 also shows one embodiment of the complementary appliance attachment component 20 by which cargo bed enclosure B is removably attached to integral device 1. Appliance attachment component 20 comprises shouldered groove unit 22, comprising base wall 24, side walls 26, groove shoulders 28 and end aperture walls 30 through which flanged track extends. Roller bearings 32 facilitate ease of movement of flanged track 8 along appliance engagement portion 4. An additional component of the appliance attachment assembly 20 is plunger piston apparatus 34, comprising handle 36 and plunger 38. Plunger piston apparatus 34 is preferably spring-loaded for holding the plunger in the extended position or can be configured to have the plunger lock in the extended and retracted positions.

Figure 3:
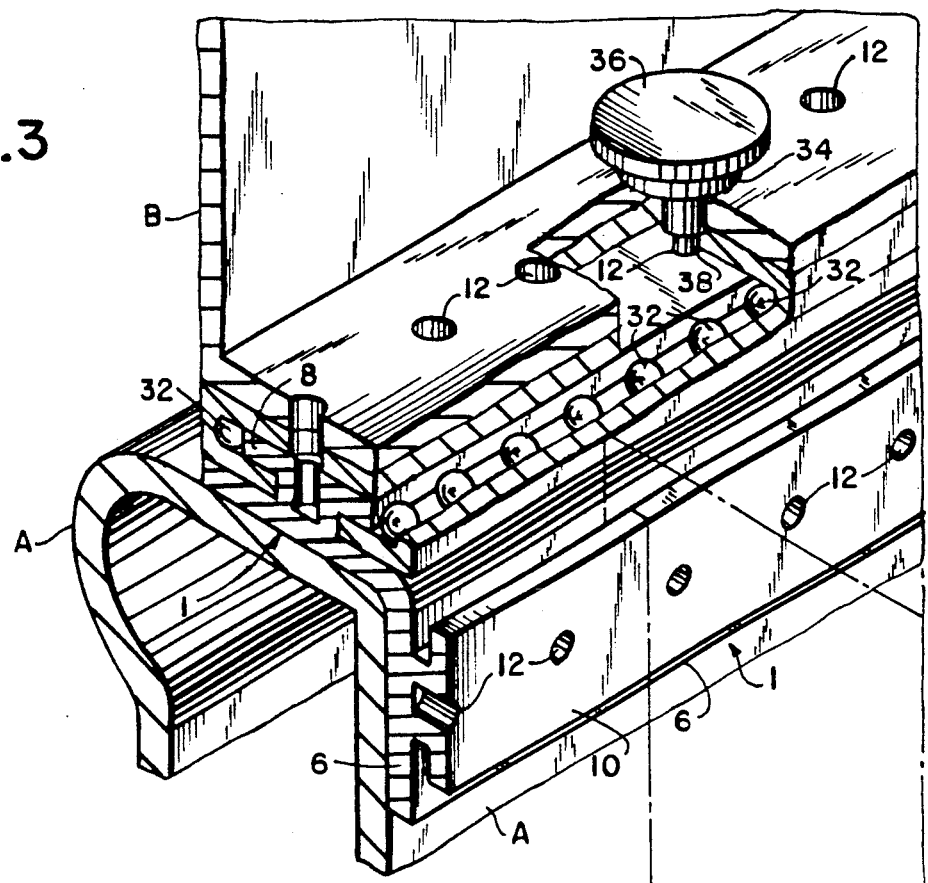
FIG. 3 is a partial cross-sectional view of the cargo bed enclosure taken along line 3—3 of FIG. 1.

FIG. 3 shows a fragmentary view of cargo bed enclosure B in position removably attached to integral device 1 which is fixed to cargo bed side wall A. In this position, cargo bed enclosure B is engaged by flanged track 8 and held in stationary position by plunger piston apparatus 34 on cargo bed enclosure B which fits plungers 38 into recesses 12 spaced along the length of flanged track 8. As such, all of the load bearing is carried on the top surface of side wall A. Appliance engagement portion 6 is free to engage a second appliance having a component complementary to flanged track 10 without any interference with or by appliance engagement portion 4 or cargo bed enclosure B.

Figure 4:
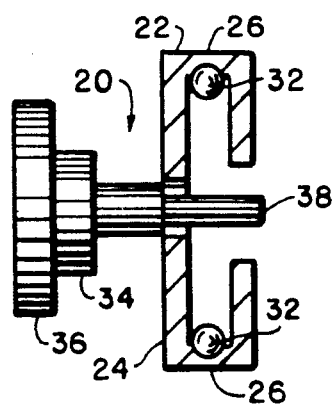
FIG. 4 is a cross-sectional view of the plunger and groove that form the attachment component on an appliance.

FIG. 4 is a cross-sectional view of appliance attachment assembly 20. Particularly evident from this view is the advantage of the ease of movement afforded by roller bearings 32 in combination with the security of stationary positioning of an attached apparatus as provided by plunger piston apparatus 34.

Figure 5:
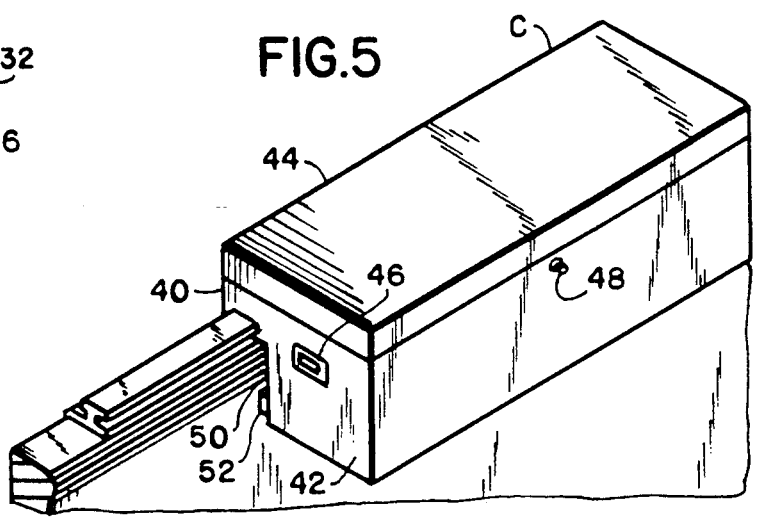
FIG. 5 is a perspective view showing an embodiment of the apparatus of the invention with a tool box mounted in position.

FIG. 5 shows outboard tool box 40 comprising tool box side walls 42, tool box lid 44, toolbox base (not shown), handles 46, lock 48, vertical surface 50 and side wall brace 52, by which tool box 40 is held parallel to the plane of cargo bed side wall A. Side wall brace 52 is preferably embodied as an adjustable cantilever bumper.

Figure 6:
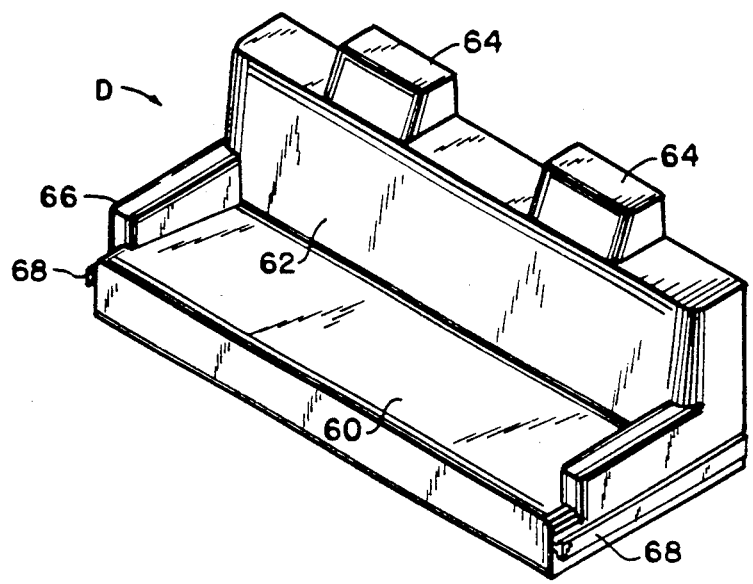
FIG. 6 is a front elevational view of a passenger seat appliance where the attachment component is in the male configuration.

FIG. 6 shows a cargo bed passenger seat appliance 0 comprising seating surface 60, seat back 62, head rest 64, arm rest 66 and flanged rail attachment component 68. This embodiment of the invention illustrates that the flanged track can be associated with an appliance to be attached to an integral assembly which assumes a complementary female configuration, having horizontal and vertical grooved appliance engagement portions.

Figure 7:
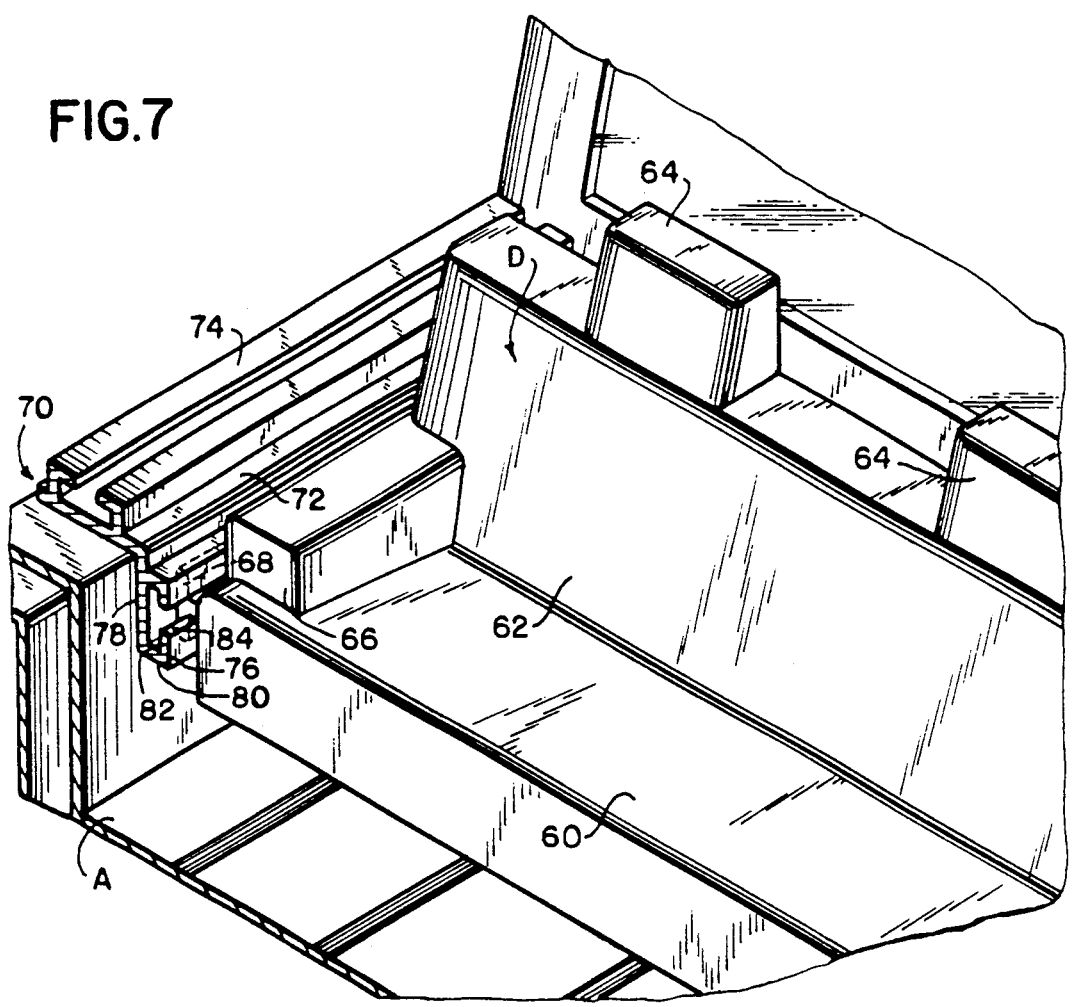
FIG. 7 is a partial perspective view showing a male configuration appliance attachment component attached in stationary position with a female configuration of one appliance engagement portion of the integral device of the invention.

FIG. 7 shows cargo bed passenger seat appliance D, as described in more detail above, engaged with an integral device 70 in female configuration. Integral device 70 comprises main body 72 that includes a horizontal shouldered groove appliance engagement portion 74 and vertical shouldered groove appliance engagement portion 76. Appliance engagement portion 76 is complementary to flanged rail attachment component 68 and is comprised of base wall 78, side walls 80, groove shoulders 82 and end aperture walls 84 that define an opening through which flanged rail attachment component 68 extends.

In summary, the detailed description and related drawings illustrate in detail numerous embodiments of apparatus for the attachment of appliances including those mentioned above and others which are well known and can be modified to have components complementary to the integral device of the invention with the benefit of the disclosure and teaching of the instant specification. Although the invention has been described with particularity, numerous changes in the details, combinations and arrangement of elements may be resorted to without departing from the scope of the invention.

What is claimed is:

1. Apparatus comprising an integral device of first and second means for attaching a plurality of independently installable and removable appliances to the side walls, having top and side surfaces, of a vehicle cargo bed, each such integral device comprising:

a main body attachable to the cargo bed side wall and having substantially perpendicular first and second elongated portions;

first and second appliance engagement means attached to and extending along the length of the first and second portions, respectively, each appliance engagement means being adapted to fit with a complementary component of an appliance so as to permit installation and removal of an appliance independent of the presence or absence of an appliance associated with the other appliance engagement means; and means associated with each of the first and second appliance engagement means for attaching the appliance in a stationary position with respect to the appliance engagement means.

2. The apparatus of claim 1 wherein the means for attaching the appliance in a stationary position comprises a plurality of fastener components positioned along the means extending along the length of each of the first and second portions and adapted to engage a complementary fastener component of the appliance.

3. The apparatus of claim 2 wherein the means for holding the appliance stationary with respect to the attachment means comprise a plurality of recesses in the attachment means which are adapted to receive complementary retractable plungers.

4. The apparatus of claim 1 wherein one of the first and second portions is attachable to the top surface of the vehicle side wall and the other of the first and second portions is positioned adjacent to the interior surface of the vehicle side wall when the first portion is attached to the side wall top surface.

5. The apparatus of claim 1 wherein the means for fixing the apparatus to the vehicle side wall comprises means for attaching one of the first and second portions to the top surface of the vehicle side wall and means for attaching the other of the first and second portions to a structural support for said vehicle side wall.

6. Apparatus for attaching a plurality of independently installable and removable appliances to the side walls, having top and side surfaces, of a vehicle cargo bed, which apparatus comprises:

(a) an integral device comprising a main body attachable to the vehicle cargo bed side wall and having substantially perpendicular first and second elongated portions;

first and second appliance engagement means attached to and extending along the length of the first and second portions, respectively, each appliance engagement means being adapted to fit with a complementary component of an appliance so as to permit installation and removal of an appliance independent of the presence or absence of an appliance associated with the other appliance engagement means; and means associated with each of the first and second appliance engagement means for attaching the appliance in a stationary position with respect to the appliance engagement means;

(b) a first component associated with a first appliance, which component is complementary to and engagable with a first appliance engagement means of the integral device; and (c) a second component associated with a second appliance, which component is complementary to and engagable with a first appliance engagement means of the integral device.

7. The apparatus of claim 6 wherein the means for attaching the first appliance in a stationary position comprises a plurality of components associated with the appliance engagement means therefor of the integral device and adapted to engage a complementary component of the appliance.

8. The apparatus of claim 7 wherein the attachment means comprise a plurality of recesses that are adapted to receive complementary retractable plungers of the appliance component.

9. The apparatus of claim 6 wherein the side surfaces of the side walls comprise an interior and exterior surface for each side wall and the first portion is attachable to the top of the vehicle side wall and for positioning the second portion adjacent to the interior surface of the vehicle cargo bed sidewall.

10. The apparatus of claim 6 wherein the means for attaching the apparatus to the vehicle sidewall comprises means for attaching one of the first and second portions to the top of the vehicle side wall and for attaching the other of the first and second portions to a support for the vehicle cargo bed side wall.

11. The apparatus of claim 6 wherein at least one of the appliances is a tool box having a component complementary to the appliance engagement means of the integral device.

12. The apparatus of claim 11 wherein the tool box is adapted to reside laterally exterior to the cargo bed side wall.

13. The apparatus of claim 11 wherein the tool box is adapted to reside within the cargo bed.

14. The apparatus of claim 6 wherein at least one of the appliances is a cargo bed enclosure having a component complementary to the appliance engagement means of the integral device.

15. The apparatus of claim 6 wherein at least one of the appliances is a passenger seat having a component complementary to the appliance engagement means of the integral device.

16. The apparatus of claim 6 wherein the means for attaching the second appliance in a stationary position comprises a plurality of components. associated with the appliance engagement means therefor of the integral device and adapted to engage a complementary component of the appliance.

* * * * *